Jan. 25, 1944.   F. S. RIMER   2,340,019
INSECT SWATTER
Filed July 26, 1941

INVENTOR
F. S. RIMER
BY P. H. Lamphere
ATTORNEY

Patented Jan. 25, 1944

2,340,019

UNITED STATES PATENT OFFICE 2,340,019

INSECT SWATTER

Foister S. Rimer, Richland, Mo.

Application July 26, 1941, Serial No. 404,135

9 Claims. (Cl. 43—137)

My invention relates to an improved insect swatter commonly known as a household fly swatter.

One of the objects of my invention is to provide an insect swatter with a striking blade which is readily removable so that it can be replaced by a new blade when it becomes worn or unsanitary.

Another object of my invention is to produce an insect swatter which will have such a flexible handle between the hand gripping portion and the swatter blade that the user of the swatter can easily kill insects by expending a minimum of effort.

Still another object of my invention is to produce an insect swatter which will be very effective in killing insects, will be economical to own, may be kept sanitary, and also one which will have an attractive appearance.

Figure 1:
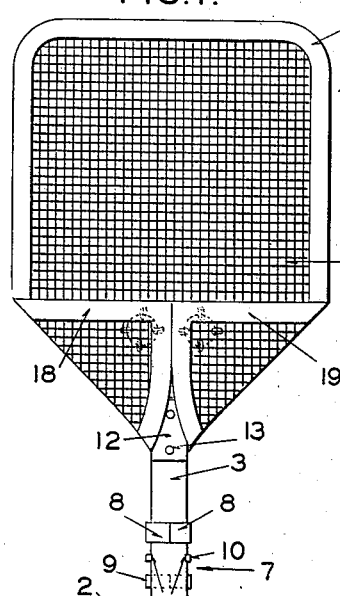
Figure 4:
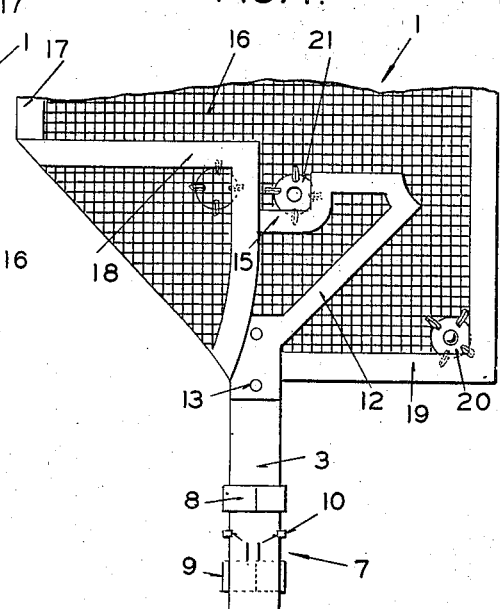
Figure 5:
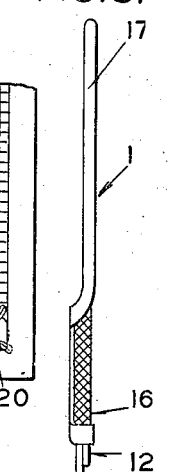
Figure 3:
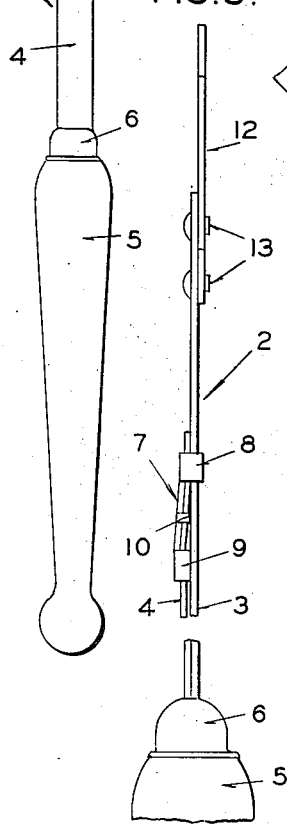
Figure 2:
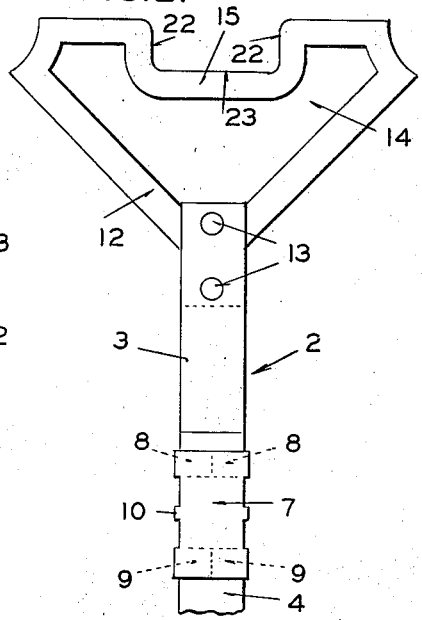

Other objects of my invention will become apparent from the following description taken in connection with the accompanying drawing in which Figure 1 is a top view of an insect swatter embodying my invention; Figure 2 is a view of the end portion of the handle to which the swatter blade is attached; Figure 3 is a side view of the handle showing the manner in which the two flexible strips are associated with each other to produce the flexible handle; Figure 4 is a view showing how the swatter blade is removably attached to the end of the handle; and Figure 5 is a side view showing a modified handle construction in which only one spring strip is employed.

Referring to Figures 1 to 4, in detail, 1 indicates the striking blade of the insect swatter and 2 the handle. The shaft portion of the handle 2 comprises two strips of material 3 and 4 which are preferably of spring steel in order to have a substantial degree of flexibility without any permanent deformation. The strips are positioned adjacent each other and the strip 3 is of somewhat greater length than strip 4. Both of the strips have their adjacent ends mounted in a hand gripping member 5 which may be of any shape desired and made of any suitable material such as wood or a molded plastic. A cap 6 is carried by the inner end of the gripping member in order to cover the opening therein which receives the ends of the two strips 3 and 4. The end of strip 4 which is short of the end of strip 3 is fastened to said strip 3 by a clamping member 7 so as to hold the two strips together at the end of strip 4. This clamping member, which is also preferably made of metal, is provided with ears 8 at one end and ears 9 at the other end. The ears 8 are bent around strip 3 so that both strips are clamped together by said ears. The other ears 9 are only bent around the short strip 4, said ears, when in final position, lying between the two strips and maintaining them separated as best shown in Figure 3. The clamping element is also provided with short projections 10 which are adapted to engage depressions 11 in the edge of the metal strip 4 to hold the clamping member from sliding longitudinally and becoming displaced from the end of strip 4.

The end of strip 3 remote from the hand gripping member 5 carries a triangular-shaped member 12, also preferably made of metal, which is suitably secured by rivets to the said end of the strip. This triangular member serves as the attaching means for the striking blade 1 previously referred to. The triangular member is so stamped out as to be provided with an open central portion 14 (for lightness) and a U-shaped side 15, said side being opposite the end of strip 3 to which an apex of the triangular member is attached.

The striking blade 1 is preferably made from woven material 16, although perforated rubber or other material may be employed. The woven material may be of wire, twisted Cellophane, heavy thread, and so forth. The woven material is provided with an edge binding 17 to prevent unravelling, such being the usual practice. The striking blade is of general rectangular shape and two corners thereof are employed to form tapered flaps 18 and 19 for fastening the striking blade to the triangular member 12. In order that the striking blade may be readily attached and removed when desired, I provide each of these flaps with one element 20 of a snap, the other cooperating element 21 of each snap being carried by the body of the striking blade. The elements of the snaps may be secured in any suitable manner to the material of the striking blade, the method shown being sewing. The arrangement of the flaps and the snaps is such that when the corners are turned over to form the flaps and when the flaps are snapped into operative position, the triangular member will fit between the flaps and the body of the blade and be held therein by the snaps. The elements 21 of the snaps are so positioned that when the striking blade is fastened to the triangular member each snap is adjacent a corner formed by the side edge 22 and base edge 23. Thus, it is seen that the position of the snaps is such as to prevent lateral shifting of the striking blade on the triangular member and also the slipping down of the blade onto the handle.

By the provision of the snaps, it is seen that the striking blade may be very quickly removed from the handle of the swatter and replaced by another striking blade. Thus, if a blade becomes worn or dirty and unsanitary, it may be quickly replaced by a new blade. Also, by having the striking blade readily removable and capable of being replaced without any tools whatsoever, a new swatter can be obtained at a very small cost, the only expense being that required for a new swatter blade. Since the handle is made of permanent material which will not become worn or bent by use over a long period of time, the user does not need to expend extra money for a complete fly swatter each time the blade becomes worn or unsanitary. I am aware that striking blades have been attached to handles by means of sewing or by wire staples but such fastening means does not permit the replacement of the swatter blade without the use of a stapling machine or a needle and thread and the striking blade, when so secured to the handle, cannot, therefore, be said to be readily removable and thus a simple operation for anyone. Although I have shown snaps as a convenient fastening means for obtaining the results desired, other hand-operated fastening means requiring no tools may be employed.

By having the shaft portion of the handle of the swatter made from flexible strips preferably metal, the swatter is given the proper action during striking which might be likened to that of an old-fashioned buggy whip. The flexibility of the shaft results in the striking blade having a much stronger striking force for the effort expended than would be the case if the shaft were of wood or wire which is usual practice. By employing the two strips, the shaft of the swatter adjacent the hand gripping member is made slightly more rigid than the portion of the shaft adjacent the blade. This increased flexibility adjacent the striking blade adds materially to producing a strong striking blow with minimum effort. When the fly swatter is used, the flexibility of the shaft causes the striking blade to travel at a very rapid rate when it hits the surface upon which the insect is resting. When the fly swatter is being brought toward the insect, the shaft will be flexed backwards and if the movement of the user's arm is stopped just at about the time the blade reaches the insect, the flexibility of the shaft will cause the striking blade to be given an exceptionally rapid movement. The swatter has been found to be very efficient in hitting and killing insects, such as flies, before they can get away from beneath the blade.

In Figure 5 I have shown a slightly modified construction. Instead of the shaft of the handle being provided with two metal strips, it is provided with a single metal strip 3'. The other parts of the fly swatter are the same as previously described and are indicated by the same reference characters. When a single metal strip is employed, the flexibility of the shaft is uniform instead of being more rigid adjacent the gripping member. Although the modified construction may not be quite as effective as the construction shown in Figure 1, it has been found to make a fly swatter superior to those in which the shaft is rigid or semi-rigid as when made of wire. Since the modified construction employs only one metal strip for the shaft of the handle, it is slightly cheaper to make as the extra strip and the clamping member are eliminated.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. An insect swatter comprising a handle and a striking blade, said handle having an enlarged member carried by one end and said striking blade being detachably secured to the enlarged member, said detachable securing means comprising separable elements permanently secured to the blade and having no portion thereof passing through the enlarged member within its marginal edge when said elements are in cooperative securing position and being of a type which can be operated by hand without the necessity of any tools to thus permit the blade to be readily removed when it becomes worn or unsanitary and replaced by a new blade.

2. An insect swatter comprising a handle and a striking blade, said handle having an enlarged member carried by one end and said striking blade being made of flexible material and provided with foldable flaps adapted to cooperate with the body of the blade to form a pocket to receive the enlarged member, and means for detachably securing said flaps to the body of the blade in such a manner as to hold the member in the pocket but permit the blade to be readily removed and replaced by a similar blade, said detachable securing means being permanently carried by the blade body and the flaps and being operable by hand without the necessity of any tools.

3. An insect swatter comprising a handle and a striking blade, said handle having an enlarged member secured to one end of said handle and provided on the side opposite said handle end with a recess, said striking blade being made of flexible material and of a general rectangular shape with two of its corners folded over to provide flaps which are adapted to cooperate with the body of the blade to form a triangular pocket for receiving the enlarged member, and means for securing said flaps to the body of the blade, said securing means when in their operative positions cooperating with the edges of the recess of said enlarged member to hold the blade on the handle and prevent relative side shifting of said blade with respect to the enlarged member and also prevent said blade from slipping downwardly onto said handle.

4. An insect swatter comprising a handle and a striking blade, said handle having a triangular-shaped member secured at one apex to said handle and provided on the side opposite said apex with a recess, said striking blade being made of flexible material and of a general rectangular shape with two of its corners folded over to provide flaps which are adapted to cooperate with the body of the blade to form a triangular pocket for receiving the triangular-shaped member, and means for securing said flaps to the body of the blade, said securing means when in their operative positions cooperating with the side and bottom edges of the recess of said triangular member to hold the blade on the handle and prevent relative side shifting of said blade with respect to the triangular member and also prevent said blade from slipping downwardly onto said handle.

5. An insect swatter comprising a handle and a striking blade, said handle having a triangular-shaped member secured at one apex to said handle and provided on the side opposite said apex with a recess, said striking blade being made of flexible material provided with foldable flaps adapted to cooperate with the body of the blade to form a pocket to receive the triangular-shaped member, and means for detachably securing said flaps to the body of the blade at a point lying within said recess of the triangular member when said member is positioned in the pocket to thus hold the blade on said handle and prevent relative lateral shifting of the blade with respect to said triangular member and permit said blade to be readily removed and replaced by a similar new blade, said detachable securing means comprising snaps, at least one element of a snap being carried by a flap and the other elements of the snaps being carried by the blade.

6. An insect swatter comprising a handle and a striking blade, said handle comprising a hand gripping member and two flat strips of spring steel positioned with their flat sides adjacent each other, one of said strips being of greater length than the other with the shorter substantially parallel to the longer over its entire length and one end of each of said strips being secured to the hand gripping member, a clamping member for clamping the end of the shorter strip which is remote from the hand gripping member to the longer strip, said clamping member being provided with means for maintaining opposed flat surfaces of the two strips adjacent the clamping member in slightly spaced apart position, and means for securing the blade only to the end portion of the longer strip so that said blade is longitudinally spaced from the clamped ends of the shorter strip.

7. An insect swatter comprising a handle and a striking blade, said handle comprising a hand gripping member and two flat strips of spring steel positioned with their flat sides adjacent each other, one of said strips being of greater length than the other and the adjacent ends thereof being secured to the hand gripping member, means for clamping the end of the shorter strip which is remote from the hand gripping member to the longer strip, a triangular-shaped member having an apex portion secured to the end of the longer strip which projects beyond the clamped end of the shorter strip, and means for securing the striking blade to the triangular member, said securing means being carried wholly by the blade and permitting said blade to be quickly attached and detached by the user and without tools.

8. An insect swatter comprising a handle having a striking blade, said handle being provided at one end with an enlarged portion and said striking blade being secured to said enlarged portion by detachable securing means, said striking blade having portions thereof which are foldable over the enlarged portion of the handle and said detachable securing means comprising separable elements carried solely by the foldable portions and the body of the blade and so positioned that when they are in securing position the blade will be held on said handle by the cooperation of the foldable portions, the body of the blade and the securing means with the enlarged portion, said separable elements being of a type which can be separated by hand without the necessity of any tools to thus permit the blade to be readily removed when it becomes worn or unsanitary and replaced by a new blade.

9. An insect swatter comprising a handle and a striking blade, said handle comprising a hand gripping member and two flat strips of spring steel positioned with flat sides adjacent each other and so arranged that sand handle will be flexible between the gripping member and the blade with a greater flexibility adjacent the blade, one of said strips being of greater length than the other with the shorter substantially parallel with the longer throughout its entire length and one end of each of said strips being secured to the hand gripping member, means separate from the strips for clamping the end of the shorter strip which is remote from the hand gripping member to the longer strip and in such a manner that the shorter will make the longer more rigid throughout its length which is coextensive with the shorter, and means for securing the blade to the end portion of the longer strip which is spaced beyond the clamped end of the shorter strip.

FOISTER S. RIMER.